AUTOMATIC TELEGRAPH MESSAGE NUMBERING APPARATUS

Filed Sept. 2, 1958 4 Sheets-Sheet 1

INVENTOR
A. A. GOMES
BY Albert Weiss
ATTORNEY

Aug. 22, 1961 A. A. GOMES 2,997,533

AUTOMATIC TELEGRAPH MESSAGE NUMBERING APPARATUS

Filed Sept. 2, 1958 4 Sheets-Sheet 2

INVENTOR
A. A. GOMES
BY Albert Reiss
ATTORNEY

AUTOMATIC TELEGRAPH MESSAGE NUMBERING APPARATUS

Filed Sept. 2, 1958 4 Sheets-Sheet 3

INVENTOR
A. A. GOMES
BY Albert Rosso
ATTORNEY

AUTOMATIC TELEGRAPH MESSAGE NUMBERING APPARATUS

Filed Sept. 2, 1958 4 Sheets-Sheet 4

INVENTOR
A. A. GOMES
BY [signature]
ATTORNEY

United States Patent Office 2,997,533
Patented Aug. 22, 1961

2,997,533
AUTOMATIC TELEGRAPH MESSAGE NUMBERING APPARATUS

Abilio Angelo Gomes, Hollis, N.Y., assignor to The Commercial Cable Company, New York, N.Y., a corporation of New York Filed Sept. 2, 1958, Ser. No. 758,388
9 Claims. (Cl. 178—2)

This invention relates to telegraph apparatus and more particularly to automatic message numbering for tape transmitters.

In some telegraph offices it is customary to employ a number of transmitter distributor sets which when used with reperforators provide combined receiving and sending facilities for tape message relaying.

The transmitter distributor sets usually comprise a message transmitter distributor and a serial number transmitter distributor. The function of the number transmitter distributor is to insert automatically into the signal line from a prepared number tape, successive numbers as well as origin and destination-designation letters which will identify each message before the address and text are transmitted.

According to one feature of my invention the message numbering unit is associated with and automatically controls the reperforator at the receiving terminal of the telegraph circuit to perforate the tape with a serial message number, and preferably also with a circuit designation code, before a message is received from the transmitting position. In accordance with a further feature a monitoring printer is provided at the transmitting position, and signals are also sent back over the line under the control of the numbering unit, to enable the operator at the transmitting position to observe that the receiving equipment is operating properly.

These and other features of my invention will be more fully appreciated from a reading of the following detailed description of a preferred embodiment, taken in conjunction with the accompanying drawings, in which FIG. 1 is a layout diagram of a telegraph signalling system;

FIG. 2 is a perspective diagrammatic view of a portion of a reperforator showing certain additional mechanism used in carrying out my invention, and FIGS. 3A, 3B and 3C when placed side by side with FIG. 3B on the right of FIG. 3A and FIG. 3C on the right of FIG. 3B, is a schematic circuit diagram of a numbering unit in association with a reperforator at the receiving position.

FIG. 3 shows the manner in which

The invention will be described as applied to a known form of telegraph office equipped with terminal extension switching units for extending connection to outgoing lines. Each operator's transmitting position is provided with a set of push buttons, each button being individual to a particular destination line, such as Washington or San Francisco. Each such destination line has associated therewith receiving apparatus comprising a typing reperforator and an associated transmitter distributor. When an operator at a transmitting position presses the appropriate push button to select, for example, the Washington line, the appropriate terminal set in the line finder is marked and the transmitting position is connected over the line finder to the typing reperforator associated with the line extending to the desired destination, in this case, the Washington line. The polarity of the current from the connection to the typing reperforator is then reversed, responsive to which relay means in the receiving apparatus applies power to the driving motor of the typing reperforator. The operator at the transmitting position now sends the message over the seized two-way line to the typing reperforator which receives it and perforates a tape which in turn is run through the transmitter distributor to transmit the message over the destination line to the distant office in Washington. At the end of transmission of the message from the operator's transmitting position to the typing reperforator the line finder equipment is released and the polarity of current over the line to the typing reperforator is again reversed and the drive to the reperforator is stopped. The system thus far described is well-known and in current use in central telegraph offices. For a detailed description of such a system and the component parts thereof, reference may be had to U.S. Patent No. 2,632,044.

An object of the present invention is to modify the above noted system with the provision of means, directly associated with the typing reperforator at the receiving apparatus, for automatically perforating the tape, prior to the transmission of a message, with the circuit designation letters and message serial number, and for sending back to the transmitting position telegraph signals responsive to which a monitor printer at the last-mentioned position prints such designation letters and message serial number for the information of the operator thereat. The receiving apparatus may thus be unattended. Subsequently, when the tape is run through the tape controlled transmitter distributor, the designation letters and serial number are printed on the message blank at the distant destination office.

Figure 1:
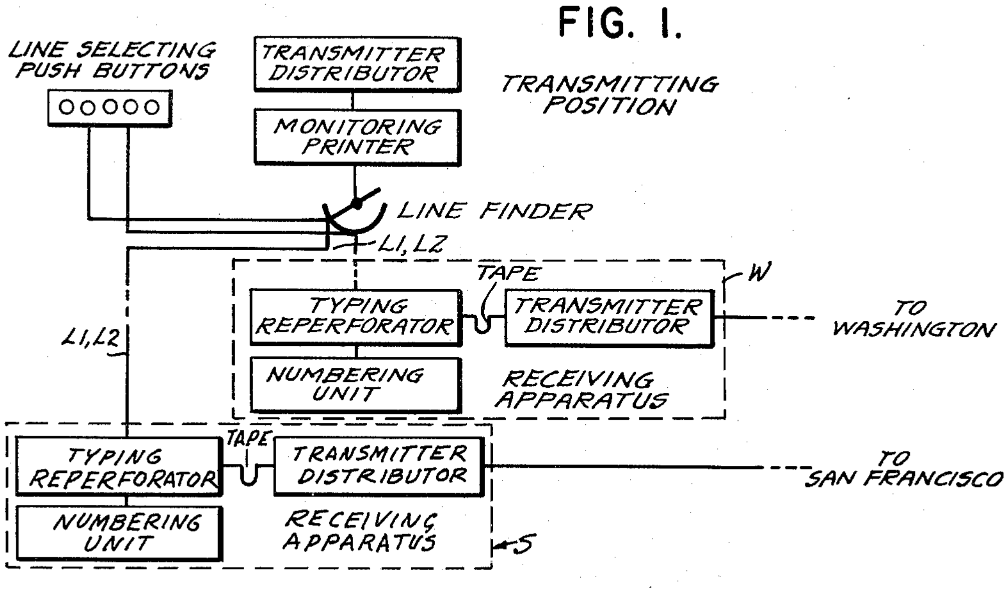
Figures 2, 3:
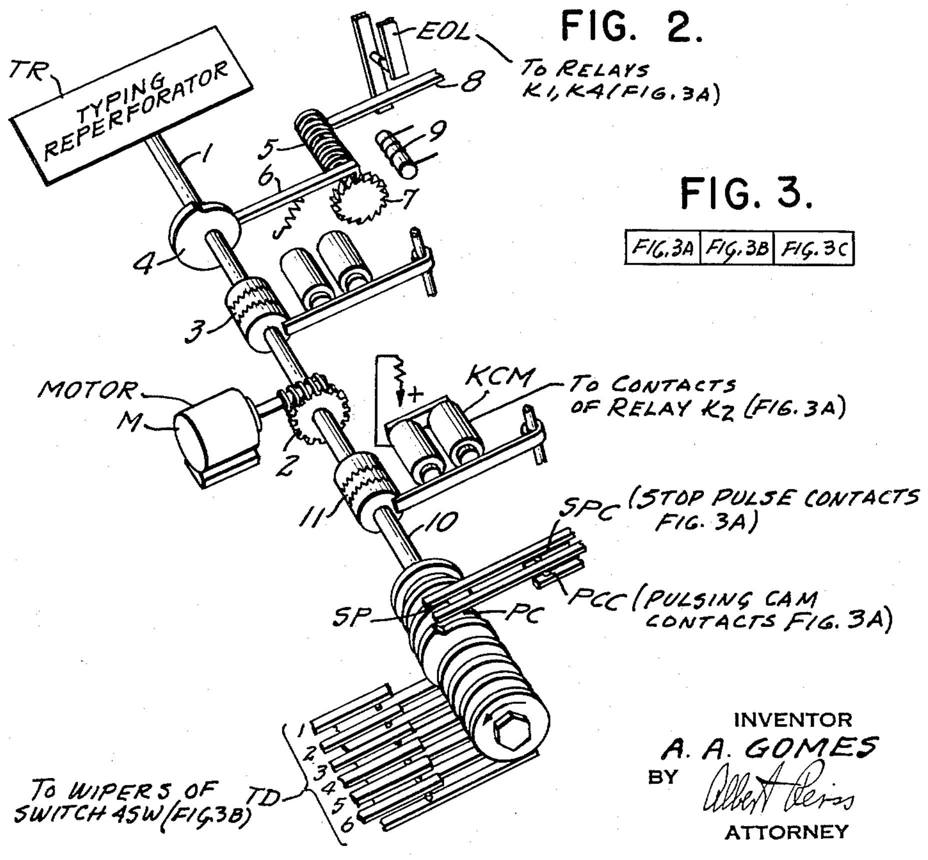
Figure 3A:
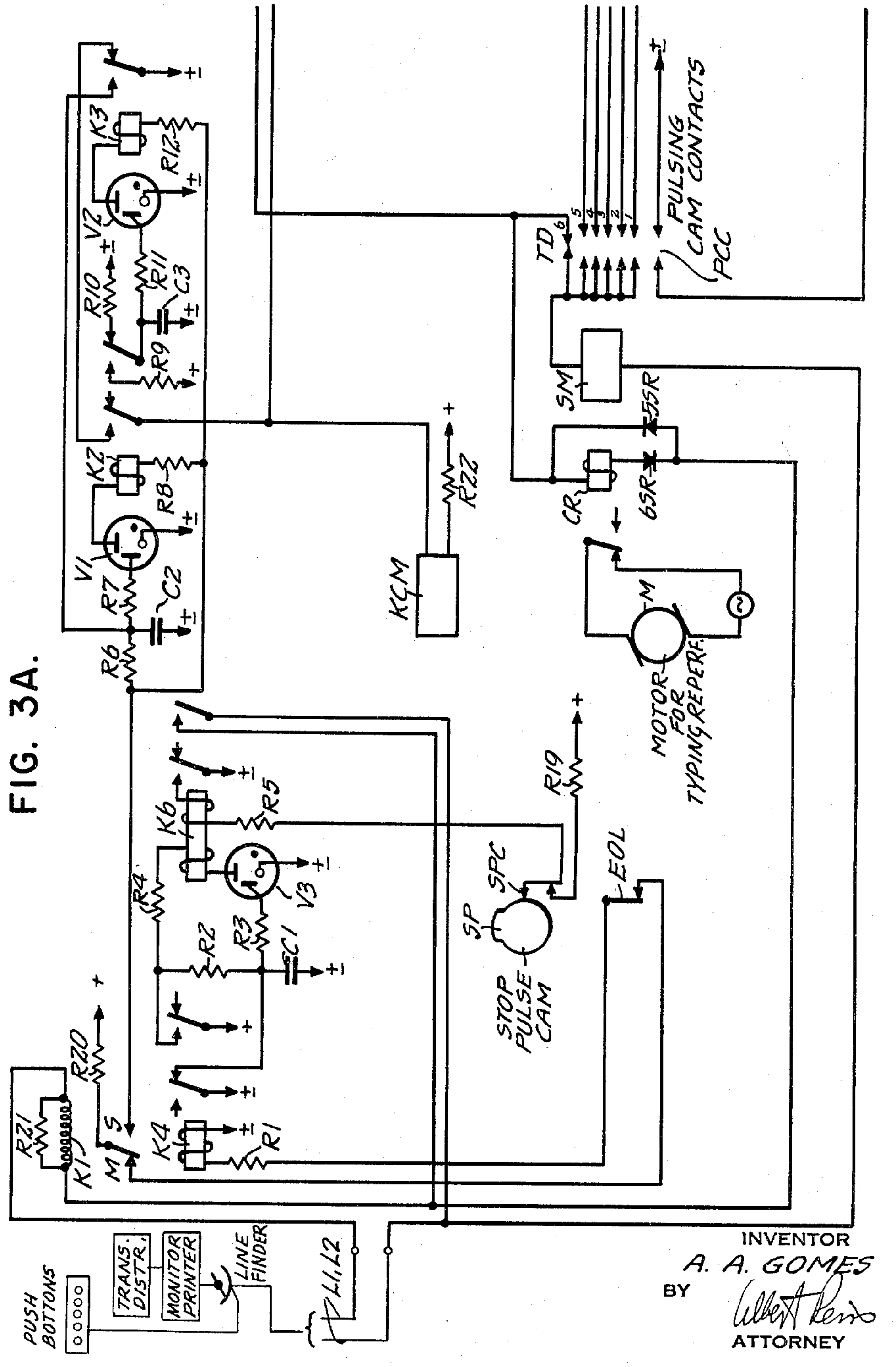
FIGS. 3A, 3B and 3C are assembled to provide the complete schematic circuit diagram of the reperforator and numbering unit according to the invention.
Figure 3B:
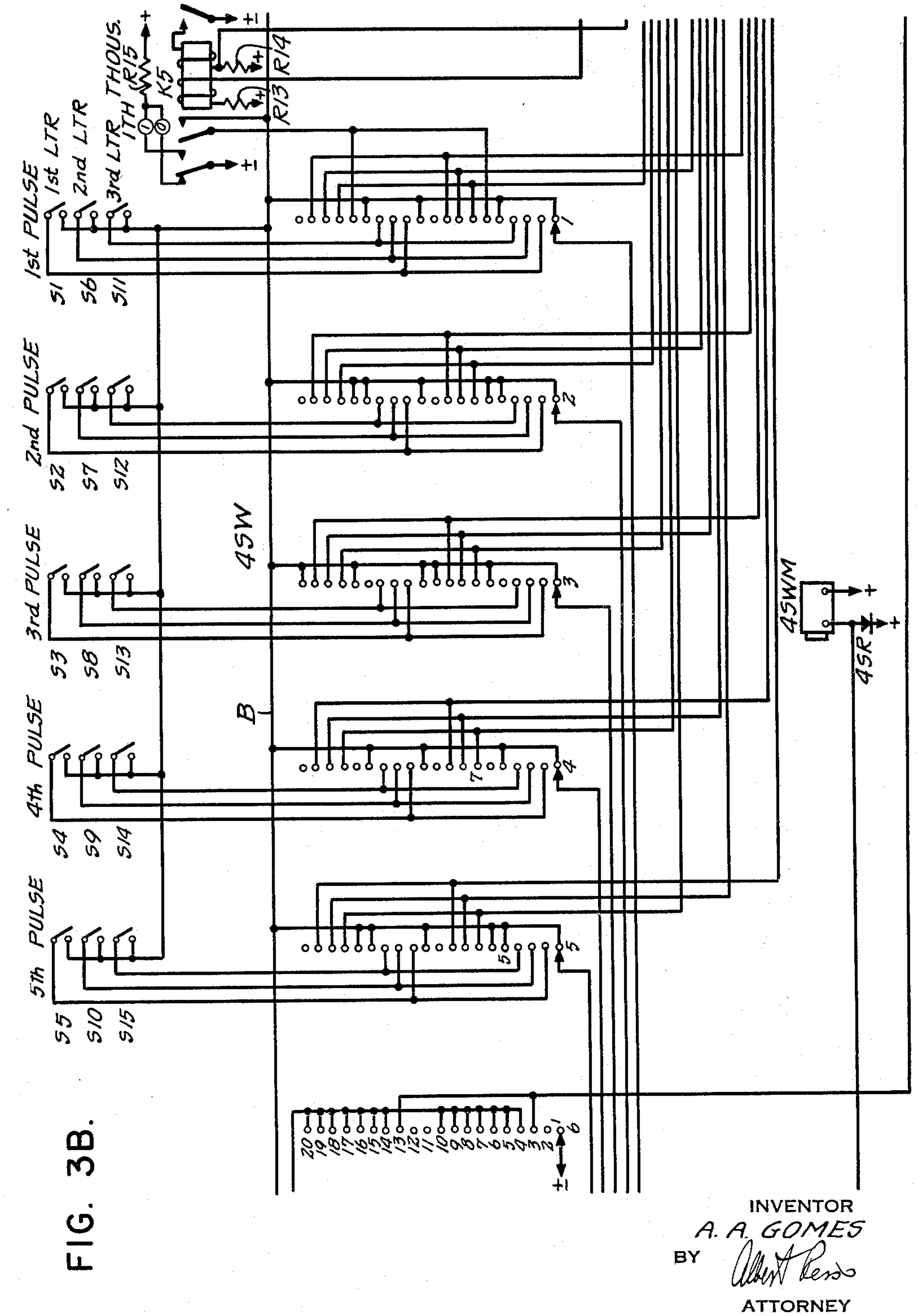
Figure 3C:
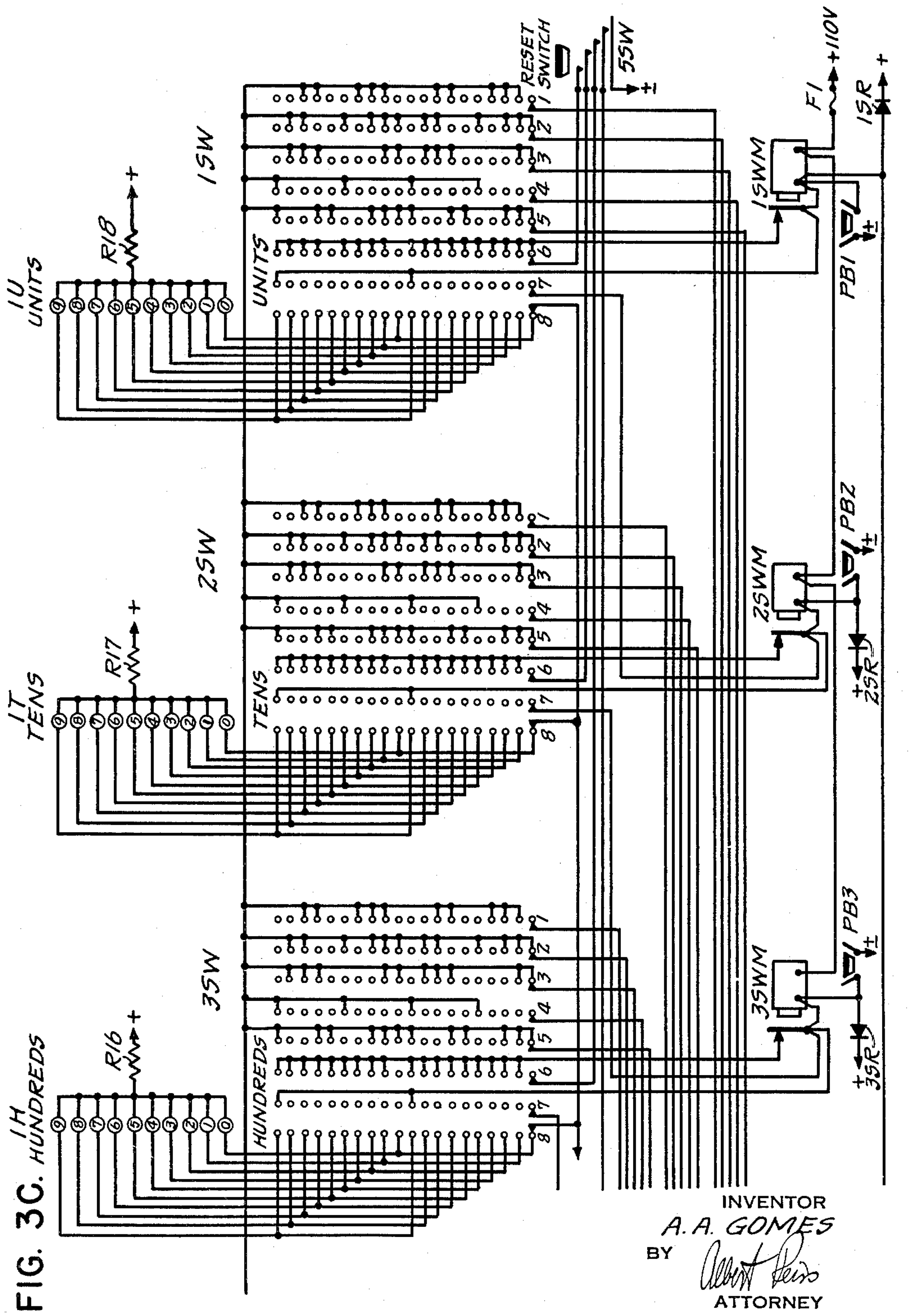

FIG. 1 shows in block diagram form a system embodying the invention. It comprises a transmitting operator's position which includes a conventional telegraph transmitter distributor of well known construction. At the operator's position there is also provided any well known form of monitoring printer which monitors the information transmitted over the selected outgoing line. The operator's transmitting position is arranged to be connected to any one of a series of receiving apparatus units, two of which are shown in the drawing and designated W and S respectively, there being one such receiving apparatus unit for each outgoing line. For example, the receiving apparatus for the Washington line comprises the typing reperforator of any well known construction, such for example as disclosed in U.S. Patent No. 2,174,-731. This typing reperforator, as is well known in the art, types the message and its related information to be transmitted over its associated line and also perforates a telegraph tape with coded information of the same message and related information. This tape is then fed through any well known tape-controlled transmitter distributor for transmission over the associated line. Since such elements, such as operators' positions with monitoring printers and the typing reperforator and tape-controlled transmitter distributor are well known in the art, detailed descriptions thereof are not necessary herein, but reference may be had to U.S. Patent No. 2,630,-044 as above noted for typical apparatus that may be used. Each receiving apparatus also includes a numbering unit which is disclosed in detail in FIGS. 3A, 3B, 3C of the present application, and this numbering unit is connected to the typing reperforator as schematically shown in FIG. 2 of the present drawing to operate the said typing reperforator in such a way as to punch the tape with a code representing the serial number of each message that is transmitted to the transmitter distributor. At the same time this information is sent to the monitoring printer at the transmitting operator's position. Merely for simplicity in FIG. 1 of the drawing only two outgoing lines are illustrated with their associated receiving apparatus units. Since there will be a multiplicity of such units of receiving apparatus corresponding to the number of outgoing lines, it is necessary to provide a selector switch arrangement identified in the drawing as a "line finder" for selectively connecting the transmitting operator's position including the transmitter distributor and monitoring printer thereat to the selected receiving apparatus and outgoing line. For that purpose each transmitting operator's position has a series of line selecting push buttons which are connected to the bank contacts of the line finder switch, there being one such button for each unit of receiving apparatus and, therefore, for one of each of the outgoing lines. Since such selector switches or line finders are well known in the art, detailed description thereof is not necessary herein, but reference may be had to Electrical Engineer's Handbook, Pender-McIlwain, 4th edition, pp. 17–22 for a typical line finder. In the manner well known in the selector switch art, as soon as a line selecting button is operated, it causes the line finder to hunt for the particular set of contacts in the line finder bank allotted to the desired outgoing line, whereupon the line finder ceases hunting and the transmitting operator's position is connected in circuit with the appropriate selected receiving apparatus and the associated outgoing line. It will be understood, of course, that any well known form of selector switch arrangement may be used to selectively connect the transmitting operator's position with the selected receiving apparatus and its outgoing line.

Basically the typing reperforator is of well-known construction and may comprise a Teletype No. 14 machine manufactured by Teletype Corporation to which has been added a set of transmitter distributor contacts, a keyboard cam magnet, a pulsing cam and a pair of pusing cam contacts, a stop-pulse cam and a pair of stop pulse contacts and an end of line device including a pair of end of line contacts.

FIG. 2 illustrates by means of the rectangule entitled +R diagrammatically in perspective a typing reperforator TR of any well known kind, the shaft 1 of which is driven in the usual manner by a motor M through gearing 2 and a magnetically controlled clutch 3. An end of line cam 4 mounted on the shaft 1 rotates a worm 5 through a pawl 6 and ratchet 7. A traveller member 8 engages in the worm 5, and after a predetermined number of rotations of the shaft 1 is arranged to open a pair of end of line contacts EOL. A release magnet 9 is provided for returning the traveller member 8 to its initial position. End of line indicating mechanism of this kind is well-known in the teleprinter art and further description is not deemed necessary.

A cam shaft 10 has mounted thereon a cam barrel comprising six distributor cams, a pulsing cam PC for actuating a pair of pulsing contacts PCC and a stop pulse cam SP for actuating a pair of stop pulse contacts SPC. The distributor cams actuate a set of six pairs of transmitter distributor contacts TD in the customary manner. The shaft 10 is adapted to be coupled to the shaft 1 by a clutch 11 under the control of a magnet KCM.

Referring now to the schematic circuit diagram of FIG. 3 the automatic numbering unit comprises three rows of switches S1 to S5, S6 to S10, and S11 to S15, which are respectively pre-set to correspond with the five-unit code combinations of the desired circuit designation letters. One contact of each of the switches S1 to S15 is connected to the common bus-bar B and the other to bank terminals 2, 3, 4 and 12, 13, 14 of five respective terminal rows (shown vertically) of a stepping sequence switch 4SW. Units, tens and hundreds numbering switches 1SW, 2SW and 3SW, are each provided with eight terminal rows (also shown vertically) the first five of which (counting from the right) in the various positions of the switches are wired in accordance with the respective five-element code combination of the corresponding serial number digital figures. The sixth rows of terminals are provided for resetting the switches, the seventh rows for the "carry-over" function, and the eighth rows are wired to respective units, tens and hundreds banks of neon lamp indicators 1U, 1T and 1H. Since the capacity of the numbering unit is 1999, a relay K5 is provided for the determination and indication of the thousands digit 0 or 1. The switches SW1 to SW4 are 20 point electromagnetic stepping switches of any well-known construction, the twenty terminal sets of which provide for two operation cycles in a single rotation of their wipers. Gas filled tubes V1, V2 and V3 of the trigger-operated type with associated time delay circuits are provided for a purpose which will be clear from a reading of the following description of the operation of the circuit.

In the idle condition, current flows over the lower line conductor L1, the selector magnet SM in the typing reperforator, stop contact 6 of the transmitter distributor TD in the typing reperforator, winding of relay CR, rectifier 6SR, winding of polar relay K1 to the upper conductor L2 of the line. In this condition relay CR is operated and the power circuit to the motor M of the typing reperforator is open at its back contacts.

When the operator at the transmitting position presses a push-button to select the line, the line finder (FIG. 1) operates and the line L1, L2 is seized, that is the appropriate receiving apparatus for the associated one of the lines L1, L2 is connected to the transmitting operator's position. The line polarity is now reversed in known manner and current flows through the rectifier 5SR but not through the rectifier 6SR. The winding of relay CR is thus bypassed and relay CR releases and applies power to the motor M of the typing reperforator. The armature of polar relay K1 changes over from its mark (M) to its space (S) contacts and a circuit is completed through protective resistor R20, armature and right hand contact of relay K1, resistor R6 and capacitor C2. Positive or marking potential is also applied to the plates of the gas trigger tubes V1 and V2 over resistors R8 and R12 and the windings of relays K2 and K3, respectively. After a delay of about 200 milliseconds, capacitor C2 charges to about 70 volts, which is applied through a current limiting resistor R7 to the trigger electrode of gas tube V1, which ionizes and causes the operation of relay K2.

Relay K2 at its front contacts closes a circuit for the keyboard cam magnet KCM which extends over back contacts of relay K3, the winding of keyboard cam magnet KCM and protective resistor R22 to positive battery. The above noted delay of 200 milliseconds is introduced in order to permit the motor M to attain its full operating speed after the application of power to its circuit and before the cam magnet KCM is operated. The keyboard cam magnet KCM operates the clutch lever of the transmitter clutch 11 (FIG. 2) and cam shaft 10 starts rotating.

As the cam shaft rotates, contacts 6 of the transmitter distributor open, 17.5 ms. after contacts 6 open, then contacts 1 close, 17.5 ms. later contacts 1 open and contacts 2 close, and so on until contacts 6 close again 105 ms. after they had originally opened. This timing is for a telegraph speed of 57 bauds or 75 words per minute.

Each of the cam contacts 1 through 5, is connected to a wiper of the sequence stepping switch 4SW. During the first revolution of the distributor cam shaft, the wipers of the switch 4SW are resting on position 2 (or 12) to which they were moved at the end of the transmission of the preceding Serial Number. The latter code combination which has been set up on the respective #2 bank contacts of banks 1 to 5 of switch 4SW by the preset positions of the first letter row of switches S1 to S5 will, therefore, be transmitted over the line L1, L2 to the transmitter operator's position where it will be printed on the monitoring printer. It will be noted that the sending circuit includes the winding of the selector magnet Sm of the reperforator. Upon the deenergization of the selector magnet responsive to the opening of distributor contacts 6, the selector cam shaft in the reperforator is released for rotation and thereafter the punch mechanism is caused to perforate the tape with the code combination representing the first letter of the three letter symbol identifying the destination line, all in a well-known manner.

Pulsing cam contacts PCC are arranged to close during the time that the fifth signal pulse or element is being transmitted and at this time an obvious circuit is completed for the stepping magnet 4SWM of the sequence switch 4SW. When the pulsing cam contacts PCC open a moment later, the rectifier 4SR absorbs the inductive kick from the winding of the magnet 4SWM and the switch 4SW is stepped in known manner to its next or third position. It will be appreciated that if the switch 4SW had been resting in its twelfth position, it will subsequently be stepped to positions in which the bank contacts are similarly wired to the bank contacts in positions two through ten.

During the second revolution of the cam shaft, the code combination set up by the actuated positions on the second letter switches S6 to S10 will be transmitted over the line to the transmitting operator's position in a similar manner.

At the same time current flows through the winding of the stepping magnet 1SWM of the units stepping switch 1SW over the sixth wiper of the sequence switch 4SW (in position 3). On the next closure of the pulsing contacts PCC the switch 4SW steps to its fourth position thereby opening the circuit of the stepping magnet 1SWM and causing the units stepping switch 1SW to step to its next position thus advancing the numbering unit to the next serial number.

Reverting to the operation of relay K2, when this relay was energized, a charging circuit was closed for the capacitor C3 over the resistor R9 and the front contacts of K2. After a delay determined by the resistance-capacity time constant, the voltage to which the capacitor C3 is charged rises to a sufficiently high value and is applied over resistor R11 to fire the gas tube V2. Upon the ionization of the gas tube V2, the relay K3 is operated, at its front contacts it charges the capacitor C2 and at its back contacts it opens the circuit of the keyboard cam magnet KCM. The delay introduced by the resistance-capacity circuit R9, C3 is sufficient to permit the cam shaft to start on its second revolution before the circuit of the cam magnet KCM is opened at the back contacts of relay K3. At the end of the second revolution, the pulsing cam contacts PCC step the sequence switch 4SW to its fourth position in which the contact in the sixth bank is connected to the upper terminal of the cam magnet KCM whereby this magnet continues to be energized over the sixth wiper in positions 4 to 10 of the switch.

In the fourth position of the sequence switch 4SW and during the third revolution of the cam shaft the code combination set up by the third letter row of switches S11 to S15 is transmitted, after which the switch 4SW steps to its fifth position.

During the fourth revolution of the cam shaft, and position five of the switch 4SW, the code combination for Figure shift, that is, pulses 1, 2, 4 and 5 marking is transmitted. This is determined by the wiring to the terminals in the fifth position of the banks engaged by wipers 1 to 5 of switch 4SW.

During the fifth revolution of the cam shaft in position six of the switch 4SW, the code combination for the thousands digit 0 will be transmitted if relay K5 is unoperated, or for the thousands digit 1 if relay K5 is operated. Signal pulses 2, 3 and 5 are caused to be marking by the wiring to the terminals of the switch 4SW for the sixth position for wipers 2, 3 and 5, this being the code combination for the digit 0. If relay K5 is operated, the first pulse is also a mark since the sixth terminal of the switch 4SW engaged by wiper 1 is connected to the busbar B over the inner left hand contacts of relay K5. The code combination 1, 2, 3 and 5 marking for the digit 1 is thus sent. It will be noted that dependent upon whether the relay K5 is unoperated or operated a circuit is closed for the 0 thousands or 1 thousands neon indicator lamp 1TH.

During the sixth revolution of the cam shaft, the wipers of the switch 4SW are in position 7 and are connected through the terminals of the respective wipers 1 to 5 of the hundreds stepping switch 3SW. The transmitted signal will, therefore, be that corresponding to the code combination determined by the position of the hundreds switch 3SW and the wiring of the terminals associated with its wipers 1 through 5.

During the seventh revolution of the cam shaft the wipers of sequence switch 4SW are in position 8 and are connected through the terminals to the corresponding wipers of the tens stepping switch 2SW and the tens digit will, therefore, be transmitted.

Similarly, during the eighth revolution of the cam shaft when the wipers of the sequence switch 4SW are in position 9, the units digit will be transmitted via the units stepping switch 1SW.

During the ninth revolution of the cam shaft the wipers of the switch 4SW will be in the tenth position in which the terminal for the third signal pulse (in bank 3) is wired to produce a marking signal and since there are no connections to the other contacts in banks 1, 2, 4 and 5, the code combination for a space character—SSMSS, will be transmitted.

Near the end of the ninth revolution of the cam shaft, the winding of the stepping magnet 4SWM of the sequence switch 4SW will be energized as before over the pulsing cam contacts PCC and this switch will step to position 11. In this position the circuit of the keyboard cam magnet KCM is broken at wiper 6 but the break is sufficiently late to permit starting the cam shaft on its tenth revolution.

During the tenth revolution of the cam shaft the wipers of the switch 4SW are in the eleventh position. Since all five of the banks 1 to 5 in this position are connected for marking pulses the Letters shift code MMMMM will be transmitted. Near the end of the transmission of this code closure of the pulsing cam contacts PCC will again energize the winding of the stepping magnet 4SWM of the switch 4SW and this switch will step to the next and twelfth position in which it remains. This is the end of the automatic numbering cycle, the complete serial number having been sent. As already pointed out the signals corresponding to the designation Letters, the Figure shift, the serial number and the Letters shift are transmitted through the winding of the selector magnet SM, thus causing the reperforator to punch the tape with the corresponding code perforations.

It will be appropriate now to describe the wiring to the units stepping switch 1SW. It will be noted that the wiring of the tens and hundreds stepping switches 2SW and 3SW is similar to that of the units stepping switch 1SW. Terminals for pulses 1, 2, 3 and 5 are wired for marking in position 2, this being the code combination for the digit 1. In position 3, terminals for pulses 1, 2 and 5 are marking for the digit 2 and so forth through digit 9 in position 10. The wiring is repeated for positions 11 through 20.

Alternatively to being operated over the sixth wiper of the sequence switch 4SW in position 3 or 13, the unit switch 1SW may be operated by a push-button PB1 when it is desired to step the switch manually. Similar push buttons PB2 and PB3 are provided for the tens and hundreds stepping switches 2SW and 3SW. The winding of the stepping magnet 1SWM of the unit switch 1SW is also connected over its self-interrupter contacts, strapped terminals in the 6th bank of the switch 1SW and its sixth wiper to contacts of a reset switch 5SW. Similar circuits are provided for the stepping magnets 2SWM and 3SWM of the tens and hundreds switches 2SW and 3SW. Thus, when the reset switch 5SW is actuated, the switches 1SW, 2SW and 3SW will automatically step until the restoring circuit is broken at positions 1 or 11, thereby resetting the numbering unit to zero.

The units indicator neon lamps 1U are connected to the appropriate terminals associated with wiper 8 of the unit switch 1SW in order that a visual indication may be given to the position of the units switch 1SW. The eighth terminal bank of the tens and hundreds switches 2SW and 3SW are similarly wired to tens and hundreds banks of neon lamps IT and 1H.

It will be noted that when the units stepping switch 1SW is at position 10 or 20, the terminals of which are wired to send the code for the figure 9, there is a path from positive battery through fuse F1, winding of stepping magnet 2SWM of the tens switch 2SW, wiper 7 of the unit switch 1SW, tenth or twentieth terminal of the last-mentioned wiper 7, third or thirteenth terminal of wiper 6 of the sequence switch 4SW and wiper 6 of switch 4SW to neutral. Therefore, the units switch 1SW and the tens switch 2SW step ahead simultaneously, unit switch 1SW into its zero number position and the tens switch 2SW into its next numerical position. Similarly, when the units switch 1SW is at position 10 or 20 and the tens switch 2SW is also at position 10 or 20, all three switches 1SW, 2SW and 3SW will step ahead simultaneously.

Thousands relay K5 is operated over its left-hand winding and resistor R13 in a similar manner over wiper 7 of hundreds switch 3SW when all of the three switches, namely, the units switch 1SW, the tens switch 2SW and the hundreds switch 3SW are at either position ten or twenty. Relay K5 locks over its right hand holding winding and series resistor R14 and is released when its holding winding is short circuited by the operation of the reset switch 5SW.

After the transmission of the serial number which is punched in the tape by the reperforator and is printed on the monitoring printer at the operator's transmitting position, the message is sent over the line in the usual manner. The four Line Feed characters which are customarily sent at the end of the message, start the line feed injector to add sufficient line feed signals to bring the total to 20. This is normal practice and it is considered unnecessary to describe the operation further. The transmission then ends and the line finder equipment is disconnected, which reverses the polarity of current over the line L1, L2 in known manner.

Upon reversal of the current through polar relay K1, this relay goes to its mark position in which anode potential is removed from the gas tubes V1 and V2 and relays K2 and K3 are deenergized. Positive potential is now applied through the protective resistor R20, mark contacts of polar relay L, end of line contacts EOL in the typing reperforator and series resistor R1 to the winding of relay K4. Relay K4 operates, removing a short circuit from capacitor C1 and applying positive potential through series resistor R4 and the left-hand winding of relay K6 to the anode of gas tube V3, and also applying positive potential through resistor R2 to capacitor C1. Unless the line is seized again in the meantime and the current through relay K1 again reversed, gas tube V3 will fire after a delay of about three seconds and relay K6 will be energized. The delay is determined by the time constant of the resistance capacity R2, C1 and the ignition characteristic of the gas tube V3. Relay K6 at its outer make contacts short circuits the selector magnet SM of the typing reperforator, thereby releasing its armature, and the reperforator starts "running open" in the same manner as if the line were open and perforating center hole only or Blank characters (SSSSS) in sequence. The end of line contacts EOL are set to open after about twenty Blank characters have been perforated, at which time the circuit of relay K4 is opened and this relay releases. This disconnects the positive potential applied to the anode of tube V3 via the left-hand winding of relay K6, but the holding current through the right-hand winding of relay K6 keeps this relay operated until the stop pulse contacts SPC are opened by the stop pulse cam SP near the end of the fifth element pulse. At this time relay K6 releases and the short circuit across the reperforator selector magnet SM is removed and line current flows through this magnet and the reperforator is stopped in the usual manner. The timing of the delay introduced by the time constant circuit R1, C1, is such that the last Blank character is completed. Another character is not started, therefore the reperforator does not perforate a superfluous character which would result in a garbling when the tape is run through the transmitter distributor. The apparatus at the receiving position is then in a condition to receive another message.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. In a telegraph signalling system, a plurality of receiving equipments each including a numbering unit, a reperforator and a reperforator sender, a transmitting equipment common to all of said receiving equipments, means for connecting said transmitting equipment to any desired one of said receiving equipments, means controlled by the connection of the transmitting equipment to a receiving equipment for operating the numbering unit and the reperforator of the connected receiving equipment to record a message serial number, a monitoring printer included in said transmitting equipment, means in the reperforator sender for operating the said monitoring printer to print the recorded message serial number, means for transmitting message information from said transmitting equipment to the connected receiving equipment, means for operating the reperforator to record the said message, and means for operating the reperforator sender of the connected receiving equipment to transmit the recorded message serial number and the recorded message sequentially.

2. In a telegraph signalling system as set forth in claim 1, each of said numbering units including destination code means, means in the numbering unit responsive to the said recordation of a message serial number for operating the destination code means to control the reperforator to record destination information, and means in the said reperforator sender for transmitting the said recorded destination information after the said transmission of the recorded message serial number and before the said transmission of the recorded message.

3. In a telegraph system as set forth in claim 2, the said reperforator sender including means for operating the said monitoring printer to print the transmitted destination information.

4. In a telegraph system as set forth in claim 3 wherein said reperforator sender means for operating the said printer includes a sending cam barrel and a set of transmitter distributor contacts, a driving motor, clutch means for coupling the said motor to the said cam barrel, and means responsive to the said connection of the transmitting equipment to a selected receiving equipment for operating the said clutch to drive said cam barrel and distributor contacts.

5. In a telegraph system as set forth in claim 4 means including a delay device for delaying the operation of the said motor for a predetermined time interval after the establishment of said connection.

6. In a telegraph system as set forth in claim 5, the said means for delaying including a cam magnet, a gas tube having a cathode, an anode and a trigger electrode, a relay having contacts thereon connected to the anode of said tube, a circuit for said cam magnet including the said contacts, a time delay circuit connected to said trigger electrode, and means responsive to the said connection for applying a triggering potential to said trigger electrode over said time delay circuit.

7. In a telegraph signalling system as set forth in claim 6, a second gas tube having a cathode, an anode and a trigger electrode, a second relay having contacts thereon connected to the anode circuit of said second gas tube, the said circuit for said cam magnet also including contacts of said second relay, a second time delay circuit connected to the trigger electrode of said second gas tube and contacts controlled by said relay in the anode circuit of said first gas tube for applying a triggering potential to the trigger electrode of said second gas tube over said time delay circuit.

8. A telegraph signalling system according to claim 4, further comprising a selector magnet in said reperforator, end of line contacts set to open after a predetermined number of blank characters have been perforated in said tape, stop pulse contacts set to open near the end of the last element pulse of a code combination, a first relay, the circuit of the energizing winding of which includes said end of line contacts, a gas tube having a cathode, an anode and a trigger electrode, a second relay having an operating winding connected in the anode circuit of said gas tube and a holding winding connected in a circuit including said stop pulse contacts, contacts on said second relay connected to short circuit said selector magnet, a time delay circuit and contacts on said first relay connected to apply a triggering potential to said trigger electrode over said time delay circuit.

9. In a telegraph signalling system, a message transmitting position, a plurality of receiving positions, signalling lines extending between said transmitting position and said respective receiving positions, switching means for selecting said signalling lines, means at said transmitting position for controlling said switching means to select a signalling line extending to a desired one of said receiving positions, a reperforator at each of said receiving positions for perforating a tape in accordance with a message received from said transmitting position, a monitoring printer at said transmitting position, a message numbering and destination code unit connected with and individual to each receiving position, and means under the control of said message numbering and destination code unit for transmitting over said selected signalling line serial number and destination code signals to actuate said monitoring printer, whereby an operator at said transmitting position can observe that connection has been made to the desired receiving position.

References Cited in the file of this patent

UNITED STATES PATENTS

| | | |
|---|---|---|
| 2,193,812 | Blanton | Mar. 19, 1940 |
| 2,582,707 | Light | Jan. 15, 1952 |
| 2,587,253 | Vernam | Feb. 26, 1952 |
| 2,632,044 | Light | Mar. 17, 1953 |
| 2,805,283 | Stiles | Sept. 3, 1957 |